United States Patent [19]

Joyce

[11] Patent Number: 4,814,377
[45] Date of Patent: Mar. 21, 1989

[54] PROCESS FOR INCORPORATING HIGH MOLECULAR WEIGHT OLEFIN BASED COPOLYMERS INTO A POLYMER MATRIX

[75] Inventor: William H. Joyce, New Town, Conn.

[73] Assignee: Union Carbide Corporation, Danbury, Conn.

[21] Appl. No.: 93,223

[22] Filed: Sep. 4, 1987

[51] Int. Cl.$^4$ .................. C08F 255/02; C08F 2/34
[52] U.S. Cl. ..................... 525/53; 525/211; 525/240; 525/289; 525/290; 525/320
[58] Field of Search ............. 525/320, 289, 53, 243, 525/290

[56] References Cited

U.S. PATENT DOCUMENTS

| | | | |
|---|---|---|---|
| 3,965,083 | 6/1976 | Jezl et al. | 526/65 |
| 4,311,810 | 1/1982 | Fujii et al. | 525/53 |
| 4,499,242 | 2/1985 | Loontjens | 525/289 |
| 4,710,538 | 12/1987 | Jorgensen | 525/53 |

*Primary Examiner*—Wilbert J. Briggs, Sr.
*Attorney, Agent, or Firm*—Saul R. Bresch

[57] ABSTRACT

A process for the incorporation of a copolymer of at least one liquid alpha-olefin or diolefin comonomer having at least 7 carbon atoms into a polymer matrix comprising:

(a) in a first reaction zone, contacting at least one alpha-olefin having 2 to 6 carbon atoms with a catalyst adapted for the polymerization thereof in such a manner that a granular polymer matrix selected from the group consisting of (i) a homopolymer of ethylene or propylene and (ii) a copolymer of ethylene or propylene and at least one alpha-olefin having 2 to 6 carbon atoms is formed in admixture with active catalyst;

(b) admixing the mixture from step (a) with at least one liquid alpha-olefin or diolefin comonomer having at least 7 carbon atoms to at least partially cost the polymer matrix; and (c) introducing the mixture from step (b) into the first reaction zone or a second reaction zone together with at least one alpha-olefin having 2 to 6 carbon atoms in such a manner that polymerization is effected in the gas phase.

7 Claims, No Drawings

PROCESS FOR INCORPORATING HIGH MOLECULAR WEIGHT OLEFIN BASED COPOLYMERS INTO A POLYMER MATRIX

TECHNICAL FIELD

This invention relates to a process for incorporating a copolymer based on at least one high molecular weight olefin into an ethylene or propylene homopolymer or copolymer matrix.

BACKGROUND ART

Gas phase and liquid phase polymerization processes have been used successfully for many years to produce copolymers of various alpha-olefins. In a gas phase process where the alpha-olefins utilized in the copolymer are of low molecular weight, varying concentrations of the comonomer can be used and the portion of the copolymer attributed to the comonomer is virtually unlimited, i.e., either comonomer can be present in amounts of 1 to 99 percent by weight based on the weight of the copolymer. Where, however, one of the comonomers is of high molecular weight, i.e., a comonomer of more than 6 carbon atoms, the concentration of high molecular weight comonomer present in a copolymer produced in the gas phase is limited by the amount of high molecular weight comonomer that can be maintained in the gas phase. The reason for this limitation is that the low vapor pressure or low volatility of the high molecular weight comonomer results in very low gas phase concentrations, and thus low concentrations of high molecular weight comonomer in the copolymer. The amount of high molecular weight comonomer that can be copolymerized in the liquid phase is also limited, in this case by the fact that the high molecular weight comonomer may be extremely soluble in the resulting copolymer making the copolymer sticky and difficult to handle.

DISCLOSURE OF THE INVENTION

An object of this invention, therefore, is to provide a process whereby copolymers having at least one comonomer of high molecular weight in high concentration can be produced.

Other objects and advantages will become apparent hereinafter.

According to the present invention, the above object is met by a process for the incorporation of a copolymer of at least one liquid alpha-olefin or diolefin comonomer having at least 7 carbon atoms into a polymer matrix comprising:

(a) in a first reaction zone, contacting at least one alpha-olefin with a catalyst adapted for the polymerization thereof in such a manner that a granular polymer matrix selected from the group consisting of (i) a homopolymer of ethylene or propylene and (ii) a copolymer of ethylene or propylene and at least one alpha-olefin is formed in admixture with active catalyst;

(b) admixing the mixture from step (a) with at least one liquid alpha-olefin or diolefin comonomer having at least 7 carbon atoms to at least partially coat the polymer matrix; and (c) introducing the mixture from step (b) into the first reaction zone or a second reaction zone together with at least one alpha-olefin in such a manner that polymerization is effected in the gas phase.

More particularly, the process comprises the following steps:

(a) in a first reactor, contacting at least one alpha-olefin having 2 to 6 carbon atoms with a catalyst adapted for the polymerization thereof;

(b) effecting polymerization of at least a portion of the olefin(s) in the first reactor in such a manner that a granular polymer matrix selected from the group consisting of (i) a homopolymer of ethylene or propylene and (ii) a copolymer of ethylene or propylene and at least one alpha-olefin having 2 to 6 carbon atoms is formed in admixture with active catalyst;

(c) removing a portion of the polymer/catalyst mixture from the first reactor;

(d) admixing the mixture from step (c) with at least one liquid alpha-olefin or diolefin comonomer having at least 7 carbon atoms in sufficient amount, and in such a manner, to at least partially coat the polymer;

(e) introducing the mixture from step (d) into the first reactor or a second reactor, each reactor containing at least one unreacted alpha-olefin having 2 to 6 carbon atoms; and (f) effecting copolymerization in said reactor in the gas phase in such a manner that a copolymer of at least one liquid alpha-olefin or diolefin comonomer having at least 7 carbon atoms and at least one alpha-olefin comonomer having 2 to 6 carbon atoms is formed within the polymer matrix.

DETAILED DESCRIPTION

As noted above, the high molecular weight comonomer is defined as a liquid alpha-olefin or diolefin having at least 7 carbon atoms. The number of carbon atoms is preferably in the range of 7 to 12, however. Examples of representative comonomers are 1-heptene, 1-octene, dicyclopentadiene, and ethylidene norbornene. The term "liquid" means liquid at room temperature (about 20° C.).

The process is not dependent on any particular catalyst, i.e., when homopolymers of ethylene and ethylene based copolymers are involved, conventional polyethylene catalysts can be used and where homopolymers of propylene and propylene based copolymers are involved, conventional polypropylene catalysts are appropriate.

Typical polyethylene catalysts are a titanium based catalyst, which is disclosed together with its method for preparation in U.S. Pat. No. 4,303,771 issued on Dec. 1, 1981, and a vanadium based catalyst, which is disclosed together with its method for preparation in U.S. Pat. No. 4,508,842 issued on Apr. 2, 1985. A typical polypropylene catalyst and technique for preparation are disclosed in U.S. Pat. No. 4,414,132 issued on Nov. 8, 1983.

Process steps and conditions for polymerization are also conventional unless otherwise noted. These conventional steps and conditions are referred to in the above-mentioned patents. The copolymerization in which the copolymer is incorporated into the polymer matrix is conducted in the gas phase, preferably in fluidized bed reactors such as those described in U.S. Pat. No. 4,482,687 issued on Nov. 3, 1984.

All of the above-mentioned patents are incorporated by reference herein.

A typical polypropylene catalyst is made up of a catalyst precursor, which includes magnesium, titanium, chlorine, and an electron donor; an organoaluminum compound, which can be referred to as a cocatalyst; and a selectivity control agent. The selectivity control agent is defined as an additive, which modifies the catalyst precursor in such a manner as to increase the overall percentage of isostactic crystalline polymer produced.

The catalyst precursor can be obtained by halogenating a magnesium compound having the formula $MgR_{2-n}X_n$ wherein R is an alkoxide or aryloxide group, each R being alike or different, X is a halogen, and n=0 or 1 with a tetravalent titanium halide in the presence of a halohydrocarbon and an electron donor; contacting the halogenated product with a tetravalent titanium halide; optionally treating the resulting solid with an aromatic acid chloride; washing the halogenated product to remove unreacted titanium compounds; and recovering the solid product.

The atomic or mole ratios of catalyst components are generally as follows:

| Ratio | Broad Range | Preferred Range |
| --- | --- | --- |
| Mg to Ti | 1:1 to 50:1 | 3:1 to 30:1 |
| Cl to Mg | 1:1 to 5:1 | 2:1 to 3:1 |
| Mg to electron donor | 0.1:1 to 100:1 | 1:1 to 60:1 |
| Cocatalyst to Ti | 10:1 to 200:1 | 20:1 to 100:1 |
| Cocatalyst to selectivity control agent | 0.1:1 to 100:1 | 0.2:1 to 50:1 |

Suitable halogen containing magnesium compounds that can be used to prepare the catalyst precursor are alkoxy and aryloxy magnesium halides such as isobutoxy magnesium chloride, ethoxy magnesium bromide, phenoxy magnesium iodide, comyloxy magnesium bromide, and naphthenoxy magnesium chloride.

Magnesium compounds which can be used are magnesium dialkoxides, diaryloxides, and carboxylates having 2 to 24 carbon atoms such as magnesium di-isopropoxide, magnesium diethoxide, magnesium dibutoxide, magnesium diphenoxide, magnesium dinaphthenoxide, and ethoxy magnesium isobutoxide, magnesium dioctanoate, and magnesium dipropionate.

Magnesium compounds having one alkoxide and aryloxide group can also be employed. Examples of such compounds are ethoxy magnesium phenoxide and napthenoxide magnesium isoamyloxide. Also suitable are compounds having one carboxylate group and one alkoxide, aryloxide, or halide group such as ethoxy magnesium octanoate, phenoxy magnesium propionate, and chloromagnesium dodecanoate.

Suitable halides of tetravalent titanium include aryloxy- or alkoxy di- and -trihalides, such as dihexoxy titanium dichloride, diethoxy titanium dibromide, isopropoxy titanium triiodide, and phenoxy titanium trichloride; titanium tetrahalides, such as titanium tetrachloride, are preferred.

The halohydrocarbons employed can be aromatic or aliphatic. Each aliphatic halohydrocarbon preferably contains from 1 to 12 carbon atoms and at least 2 halogen atoms. The aliphatic halohydrocarbons include dibromomethane, trichloromethane, 1,2-dichloroethane, dichlorobutane, 1,1,3-trichloroethane, trichlorocyclohexane, dichlorofluoroethane, trichloropropane, trichlorofluorooctane, dibromodifluorodecane, hexachloroethane, and tetrachloroisooctane. Carbon tetrachloride and 1,1,3-trichloroethane are preferred. Aliphatic halohydrocarbons containing only one halogen atom per molecule such as butyl chloride and amyl chloride, can also be employed. Suitable aromatic halohydrocarbons include chlorobenzene, bromobenzene, dichlorobenzene, dichlorodibromobenzene, naphthyl chloride, chlorotoluene, and dichlorotoluene. Chlorobenzene is the most preferred halohydrocarbon.

Suitable electron donors, which can be used in the Mg/Ti complex (as an inner donor) or as a selectivity control agent (as an outer donor) separately or complexed with the organoaluminum compound, are ethers, mono- or polycarboxylic acid esters, ketones, phenols, amines, amides, imines, nitriles, silanes, phosphines, phosphites, stilbenes, arsines, phosphoramides, and alcoholates. It is understood, however, that the selectivity control agent (the outer donor) must be different from the electron donor, i.e., the inner donor.

Examples are esters of carboxylic acids such as ethyl and methyl benzoate, p-methoxy ethyl benzoate, p-ethoxy methyl benzoate, p-ethoxy ethyl benzoate, ethyl acrylate, methyl methacrylate, ethyl acetate, p-chloro ethyl benzoate, p-amino hexyl benzoate, isopropyl naphthenate, n-amyl toluate, ethyl cyclohexanoate, and propyl pivalate. Additional examples are N,N,N',N'-tetramethylethylene diamine, 1,2,4-trimethyl piperazine, and 2,2,6,6-tetramethyl piperidine.

When the electron donor for use in preparing the catalyst precursor (the inner donor) is the preferred ethyl benzoate, the preferred electron donor for use as a selectivity control agent (the outer donor) is para-ethoxy ethyl benzoate.

The hydrocarbyl aluminum cocatalyst can be represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be alike or different; and each R, which is a hydrocarbyl radical, has 1 to 20 carbon atoms, and preferably 1 to 10 carbon atoms. Further, each alkyl radical can be straight or branched chain and such hydrocarbyl radical can be a mixed radical, i.e., the radical can contain alkyl, aryl, and/or cycloalkyl groups. Examples of suitable radicals are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methoxyphenyl, benzyl, tolyl, xylyl, naphthyl, naphthal, methylnaphthyl, cyclohexyl, cycloheptyl, and cyclooctyl.

Examples of suitable hydrocarbyl aluminum compounds are as follows: triisobutylaluminum, trihexylaluminum, di-isobutylaluminum hydride, dihexylaluminum hydride, isobutylaluminum dihydride, hexylaluminum dihydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthyalminum, and tritolylaluminum. The preferred hydrocarbyl aluminums are triethylaluminum, triisobutylaluminum, trihexylaluminum, di-isobutylaluminum hydride, and dihexylaluminum hydride.

The acid halide mentioned above is the compound corresponding to the ester compound used as the inner electron donor. Preferably, the halide is a chloride or bromide. The acid halide can contain 7 to 22 carbon atoms and one or more aromatic rings.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer(s) and, if desired, modifiers and/or an inert carrier gas.

The essential parts of the reactor are the vessel, the bed, the gas distribution plate, inlet and outlet piping, a compressor, a cycle gas cooler, and a product discharge system. In the vessel, above the bed, there is a velocity reduction zone, and in the bed, a reaction zone. Both are above the gas distribution plate.

The fluidized bed reactor is operated at a temperature in the range of about 10° C. to about 150° C. and preferably about 10° C. to about 120° C. and a pressure of about 100 psig to about 700 psig and preferably about 250 psig to about 550 psig. The velocity of the fluidizing gas is in the range of about 0.1 to about 3.0 feet per second and preferably about 0.5 to about 2.5 feet per second.

The alpha-olefins introduced into the first reactor are selected from alpha-olefins having 2 to 6 carbon atoms depending on the polymer matrix desired. One of the alpha-olefins will always be either ethylene or propylene in order to provide a homopolymer of ethylene or propylene or a copolymer of ethylene or propylene. The other comonomer used to provide the copolymer is any one or more of the other 2 to 6 carbon alpha-olefins. The most commonly selected polymer matrix is the ethylene/propylene copolymer. It is observed that the polymer forms around the particles of active catalyst. Thus, the catalyst particles are embedded in the polymer matrix granules.

The granular polymer matrix can be prepared in the gas phase or liquid phase using conventional techniques such as fluidized bed, slurry, or solution processes. The reactor can be a mechanically agitated reactor such as a stirred reactor and can have heat removal means, again, all of a conventional nature. A continuous fluidized bed process is preferred. Using the fluidized bed process, the catalyst, cocatalyst, and comonomers, and any required promotor, modifier, selectivity control agent or hydrogen are continuously fed into the reactor and the polymer is continuously removed. Where ethylene copolymer is produced, its density may be varied over a wide range depending on the amount of alpha-olefin comonomer added and upon the particular comonomer employed. The greater the mole percent of alpha-olefin comonomer, the lower the density. A conventional chain transfer agent, such as hydrogen, can be used to terminate the polymer chain.

The coating step can be carried out by mixing the liquid comonomer, i.e., the high molecular weight comonomer, with the granular polymer and catalyst in a holding tank or other vessel or conduit external to the reactor, or the liquid comonomer can be sprayed onto the granular polymer while it is in the reactor or holding tank, or other vessel or conduit. The surface of the granular polymer should be at least partially coated with the liquid comonomer, preferably at least about 50 percent of the surface, and, most preferably, essentially all of the surface. It is believed that the liquid comonomer diffuses or dissolves from the surface into the polymer matrix. It may also enter the polymer matrix through voids or pores in its surface and thereupon dissolve or diffuse. In any case, the passage of the liquid comonomer from the surface to the interior of the granular polymer will be referred to as absorption.

To accomplish the coating step, a portion of the granular polymer is usually removed from the first reactor. If it is removed from a gas phase reactor, a portion of the gas phase is generally removed with the polymer, and acts as a carrier gas. This removal can be accomplished with or without a substantial reduction in pressure. If the granular polymer is taken from a slurry or solution process, separation of the polymer from the liquid is necessary before entry into the holding tank to prepare for the subsequent gas phase step.

It will be understood that the term "copolymer" is considered to include two or more different monomers incorporated into the same polymer chain, whether that of the granular polymer or the copolymer incorporated into the polymer matrix. It follows then that the liquid comonomer can be a mixture of two or more comonomers. It will also be understood that low concentrations of high molecular weight comonomers can be used to form the matrix copolymer or the copolymer which is incorporated into the polymer matrix. The gas phase copolymerization can, of course, also utilize a chain transfer agent, if one is desired. Where the granular polymer referred to is part of a continuous process (i.e., the polymerization which produces the granular polymer and thus the mixture of polymer and active catalyst) carried out in a gas phase reactor, the liquid monomer coated polymer can be returned to this reactor. If, for some reason, a return to this reactor is not desirable or practical, the copolymerization step, which must be carried out in the gas phase, is effected in another reactor. In the event that the coated polymer is returned to the first reactor, the alpha-olefins present in the first reactor and in the carrier gas copolymerize with the liquid comonomer in the polymer matrix. Of course, additional alpha-olefins can be introduced into the first reactor for this purpose. Where the coated polymer is sent to a second reactor, the alpha-olefins which copolymerize with the liquid comonomer are supplied from an outside source.

Using subject process, the portion of the copolymer based on the high molecular weight comonomer can be the same as the case where low molecular weight comonomers are used exclusively, i.e., about 1 to 99 percent by weight based on the weight of the copolymer. Usually, the portion of the copolymer attributed to the high molecular weight comonomer is in the range of about 1 to about 10 percent by weight.

The invention is illustrated by the following examples.

EXAMPLE 1

A. A reaction vessel is provided containing a bed of granular polymer, which is maintained in a fluidized state by passing a stream of fluidizing gas upward through the reaction vessel. The polymer is an ethylene/propylene copolymer and the fluidizing gas contains feed monomers, ethylene and propylene, and nitrogen as a diluent. A catalyst is also introduced into the reaction vessel, as well as hydrogen. The catalyst is a $VCl_3$/tetrahydrofuran complex together with a diethylaluminum chloride modifier on a silica support as in example 1 of U.S. Pat. No. 4,508,842, which is incorporated by reference herein. The fluidized bed is similar to the one described in U.S. Pat. No. 4,482,687. The total pressure is 300 psig; the hydrogen partial pressure is 10 psi; the temperature is 20° C.; and the fluidizing gas velocity is 2 feet per second.

B. The fluidizing gas from the reaction vessel passes overhead through a conduit to a circulating blower and then through a conduit to a gas cooler where heat released by the reaction and heat generated by the blower are removed by a refrigerant. The cooled gas then passes through a conduit where it is mixed with the feed monomers and the mixture is returned to the reaction vessel.

A portion of the fluidizing gas, prior to entry into the gas cooler, is diverted through a conduit, and a high molecular weight comonomer, ethylidene norbornene, is sprayed, as a fine mist, into the stream of fluidizing gas. Granular polymer is removed from the bottom of the fluidized bed through another conduit, either continuously or batchwise, and introduced into the stream of fluidizing gas where it is entrained and conveyed back to the reaction vessel at the top of the fluidized bed. During the conveying process, the high molecular weight comonomer is intimately mixed with the granular polymer, coating the surface of the granules or particles of polymer from where it is absorbed by the granular polymer. In the reaction vessel, the comonomer copolymerizes with the feed monomers in the granular polymer matrix. The final polymer product is withdrawn from the reactor vessel through a conduit at the bottom of the fluidized bed. The product can be described as an ethylene/propylene/ethylidene norbornene terpolymer incorporated into a granular ethylene/propylene copolymer matrix. The portion of the copolymer based on the high molecular weight comonomer is 5 percent by weight based on the weight of the copolymer.

EXAMPLE 2

A. Part A of Example 1 is repeated. The reaction vessel is provided with cycle gas piping, a recycle blower, and a cycle gas cooler. It is also provided with a product discharge system similar to that described in U.S. Pat. No. 4,621,952, issued on Nov. 11, 1986 and incorporated by reference herein.

B. Granular polymer (containing live catalyst) is withdrawn from the discharge system, through a conduit, and a high molecular weight comonomer liquid, i.e., 1-octene, is sprayed onto the granular polymer passing through the conduit. Nitrogen is also introduced into the conduit to assist in conveying the granular polymer from the blow tank of the discharge system to a second reaction vessel, which is a horizontal, mechanically agitated fluid bed reactor. During the conveying process, the high molecular weight comonomer is intimately mixed with the granular polymer, coating the surface of the granular particles, and, then being absorbed by the polymer.

An agitator in the second reaction vessel is rotated by an external electric motor to stir and mix the granular resin, which enters at one end of the horizontal vessel. Conveying gas is removed from the other end of the vessel. Additional high molecular weight comonomer liquid is sprayed onto the granular resin at three entry points along the reaction vessel, is intimately mixed with the granular polymer, coating the surface of the particles, and being absorbed by the polymer.

The comonomer is then copolymerized with ethylene contained in the conveying gas by contact with the active catalyst under conditions similar to those provided in the first reaction vessel. After a residence time sufficient for the desired extent of copolymerization of the comonomer and ethylene, about 60 minutes, the granular resin is removed from the reaction vessel. Cooling of the polymer to remove the heat released by the reaction is accomplished by introducing a cooling gas into the reaction vessel and the use of cooling jackets.

The product can be described as an ethylene/1-octene copolymer incorporated into a granular ethylene/propylene copolymer matrix. The portion of the copolymer based on the high molecular weight comonomer is 5 percent by weight based on the weight of the copolymer.

I claim:

1. A process for the incorporation of a copolymer of at least one liquid alpha-olefin or diolefin comonomer having at least 7 carbon atoms into a polymer matrix comprising:
    (a) in a first reactor, contacting at least one alpha-olefin having 2 to 6 carbon atoms with a catalyst adapted for the polymerization thereof;
    (b) effecting polymerization of at least a portion of the olefin(s) in the first reactor in such a manner that a granular polymer matrix selected from the group consisting of (i) a homopolymer of ethylene or propylene and (ii) a copolymer of ethylene or propylene and at least one alpha-olefin having 2 to 6 carbon atoms is formed in admixture with active catalyst;
    (c) removing a portion of the polymer matrix/catalyst mixture from the first reactor;
    (d) admixing the mixture from step (c) with at least one liquid alpha-olefin or diolefin comonomer having at least 7 carbon atoms in sufficient amount, and in such a manner, to at least partially coat the polymer matrix;
    (e) introducing the mixture from step (d) into the first reactor or a second reactor, each reactor containing at least one unreacted alpha-olefin having 2 to 6 carbon atoms; and
    (f) effecting copolymerization in said reactor in the gas phase in such a manner that a copolymer of at least one liquid alpha-olefin or diolefin comonomer having at least 7 carbon atoms and at least one alpha-olefin comonomer having 2 to 6 carbon atoms is formed within the polymer matrix.

2. The process defined in claim 1 wherein the admixture of the liquid comonomer and polymer matrix is carried out by spraying the comonomer onto the surface of the polymer.

3. The process defined in claim 1 wherein the liquid comonomer is ethlidene norbornene; the matrix is an ethylene/propylene copolymer; and the copolymer incorporated into the matrix is ethylene/propylene/ethylidene norbornene terpolymer.

4. The process defined in claim 1 wherein the first reactor is used in steps (e) and (f).

5. The process defined in claim 1 wherein the second reactor is used in steps (e) and (f).

6. The product resulting from the process defined in claim 1.

7. The product resulting from the process defined in claim 3.

* * * * *